(12) United States Patent
McKay et al.

(10) Patent No.: US 6,455,188 B1
(45) Date of Patent: Sep. 24, 2002

(54) BATTERY LOCK

(75) Inventors: Michael McKay, Frederiksberg; Lars Friis, Birkeroed; Axel Wagner; Peter Gorm Christensen, both of Copenhagen; Rasmus Christ Jansen, Hedehusene, all of (DK)

(73) Assignee: Nokia Mobile Phones Ltd., Espoo (FI)

( * ) Notice: Subject to any disclaimer, the term of this patent is extended or adjusted under 35 U.S.C. 154(b) by 69 days.

(21) Appl. No.: 09/644,066

(22) Filed: Aug. 23, 2000

(51) Int. Cl.[7] .......................... H01M 2/10; H04M 1/00
(52) U.S. Cl. .......................... 429/97; 429/96; 429/100; 455/572
(58) Field of Search .......................... 429/97, 96, 100; 455/572

(56) References Cited

U.S. PATENT DOCUMENTS

| | | | | |
|---|---|---|---|---|
| 5,693,431 A | * | 12/1997 | Nierescher et al. | 429/97 |
| 5,716,730 A | * | 2/1998 | Deguchi | 429/27 |
| 6,060,193 A | * | 5/2000 | Remes et al. | 429/96 |

* cited by examiner

Primary Examiner—Patrick Ryan
Assistant Examiner—Angela J. Martin
(74) Attorney, Agent, or Firm—Antonelli, Terry, Stout, & Kraus, LLP

(57) ABSTRACT

A battery lock for a communication unit with holding means for holding an internal battery in operating position in a battery compartment. The holding means includes features to hold, lift and release the battery in the compartment from the battery compartment. The battery compartment includes protruding parts corresponding to slots on the battery, where the protruding parts co-operates with holding means of the battery to hold the battery in the battery compartment. The holding means of the battery lock includes first protruding parts to hold the battery in the battery compartment, grips to lift and release the battery, holes to hinge the battery lock in the battery compartment, second protruding parts to lift the battery actuated by the grips and fastening means to fasten the battery lock to the battery compartment. The fastening means on the battery compartment to fasten the battery lock to the battery compartment include pivots to hinge the battery on, locking flaps to keep the battery lock on the pivots and protruding parts that connects to slots on the grips of the battery lock.

17 Claims, 6 Drawing Sheets

BATTERY LOCK

BACKGROUND OF THE INVENTION

The invention relates to a battery lock for holding a battery in operating position and enabling easy retrieval of the battery from the operating position.

It is earlier known to have internal batteries in communication units like in Nokia™ mobile phones 3210 and 8850 or Motorola™ mobile phones cd920 and L7089. The Nokia™ 3210 has holding means located mainly on the battery, and includes protruding parts that project in slots in the battery compartment. One of these protruding parts can be depressed to release the battery from the battery compartment.

Both Nokia™ 8850, Motorola™ cd920 and L7089 have batteries that are squeezed into the battery compartment and being pressed in a holding position in the battery compartment by resilient battery contacts. The battery contacts are depressed establishing a pressure on the battery then the battery is placed into the battery compartment. The Motorola™ cd920 has two slots in one end of the battery and another slot in the other end of battery, wherein protruding parts from the battery compartment projects outwards. The Motorola™ L7089 has two protruding parts in each end of the battery that projects into slots in the battery compartment. The Nokia™ 8850 has two slots in one end of the battery, wherein protruding parts from the battery compartment projects.

SUMMARY OF THE INVENTION

An object of the invention is to provide a battery lock for holding an internal battery in operating position in a battery compartment of a communication unit.

According to claimed invention this objective is obtained by a battery lock for a communication unit having holding means including holding, lifting and releasing features.

Another object of the invention is to provide a communication unit provided with a battery compartment having mounted a battery lock having means for holding a battery in operative position.

According to the claimed invention this objective is obtained by a communication unit provided with a battery compartment, where the battery compartment includes protruding parts that projects into slots on the battery, and that said protruding parts co-operates with holding means of the battery to hold the battery in the battery compartment.

Yet another objective of the claimed invention is to provide method for holding or locking a internal battery for a communication unit into operating position in a reliable way.

According to the claimed invention this objective is obtained by using a battery lock that includes holding, lifting and releasing features to hold the battery in operating position.

BRIEF DESCRIPTION OF THE DRAWINGS

The invention will be explained more fully below, by way of example, in connection with preferred embodiments and with reference to drawing, in which.

DETAILED DESCRIPTION OF THE INVENTION

Figures 1, 2:
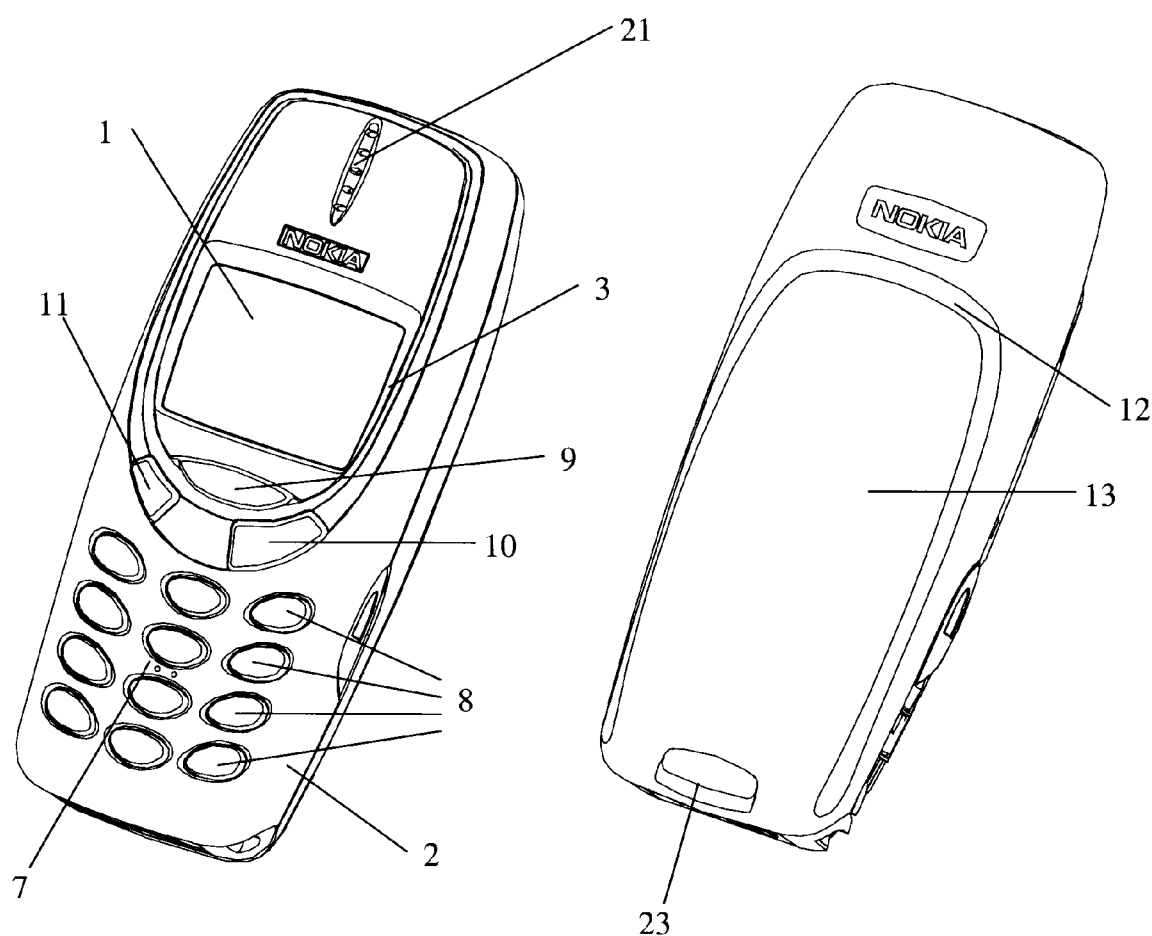
FIG. 1–2 shows in a perspective view a preferred embodiment of the communication unit according to the invention.

According to a first aspect the battery lock according to the invention will be described with reference to a hand portable phone, preferably a cellular/mobile phone. A preferred embodiment of this phone is shown in FIG. 1 and 2, where a cellular/mobile phone is shown in perspective. As will be seen, the phone is provided with a front cover 2 having a window frame 3 encircling the protection window of the display assembly 1. The cellular/mobile phone comprises a user interface having an on/off button 4, a keypad 7, a battery 14 (shown in FIG. 4), a display/LCD 1, an ear-piece 21 and a microphone 22 (not shown). In FIG. 2 the phone is shown from another perspective having back cover 13. There is also shown in FIG. 2 a release device 23 for releasing the back cover 13 from the rest of the phone, and a horseshoe shaped edge 12. The horseshoe shaped recess 12 aims to prevent the user from covering the internal antenna 24 (shown in FIG. 4) placed in the upper part of the phone with his fingers. Any covering of the antenna 24 by the user might disturb the function of the antenna 24. The horseshoe shaped recess 12 is ergonomically designed to make the user place his fingers on it and not on the antenna part of the back cover 13.

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0" or a sign "#" or "*", respectively. In alpha mode each key is associated with a number of letters and special signs used in the text editing.

The keypad 7 additionally comprises a menu selection key 9, a up/down key 10, and a cancel key 11. The functionality of the menu selection key or NaviKey™ 9 depends on the state of the phone. The NaviKey™ is used together with the up/down key 10, where the selection/navigation is made by the NaviKey™ 9 and the scrolling in the menus is made by the up/down key 10. The functionality of the NaviKey™ 9 changes depending on the menus and its present functionality is shown in separate fields in the display 1 just above the NaviKey™ 9. The cancel key 11 is used to delete an input or cancel the last selection and jump to another menu level.

The menu selection key 9 is placed centrally on the front surface of the phone between the display 1 and the group of alphanumeric keys 8. Hereby the user will be able to control this key with his thumb. This is the best site to place an input key requiring precise motor movements. Many experienced phone users are used to one-hand handling. They place the phone in the hand between the fingertips and the palm of the hand. Hereby the thumb is free for inputting information.

Figure 3:
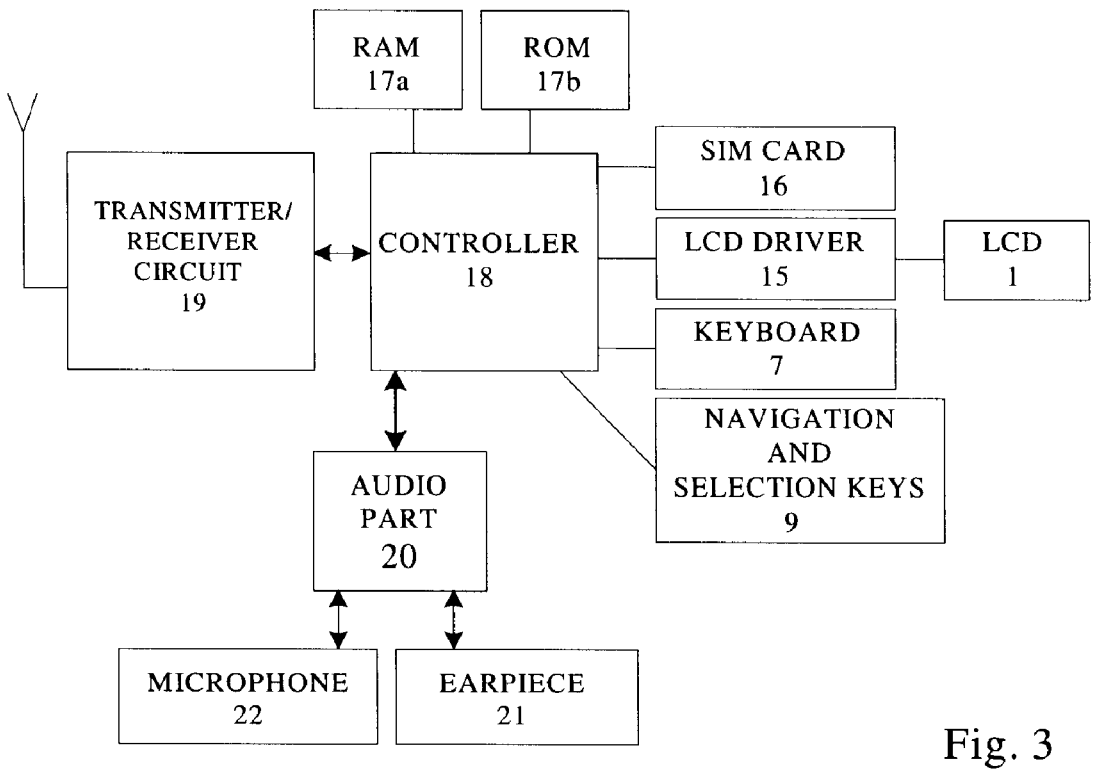
FIG. 3 schematically shows the essential parts of a telephone for communication with a cellular network.

FIG. 3 schematically shows the most important parts of a preferred embodiment of the phone/terminal, said parts being essential to the understanding of the invention. The microphone 22 records the user's speech, and the analogue signals formed thereby are AND converted in an A/D converter (not shown) before the speech is encoded in an audio part 20. The encoded speech signal is transferred to the controller 18 (physical layer processor), which e.g. supports the GSM terminal software. The controller 18 also forms the interface to the peripheral units of the apparatus, including RAM and ROM memories 17a and 17b, a SIM card 16, the display 1 and the keypad 7 (from FIG. 1) as well as data, power supply, etc. The controller 18 communicates with the transmitter/receiver circuit 19. The audio part 20 speech-decodes the signal, which is transferred from the controller 18 to the earpiece 21 via a D/A converter (not shown).

The preferred embodiment of the phone of the invention is adapted for use in connection with the GSM network, but, of course, the invention may also be applied in connection with other phone networks. It could be cellular networks, various forms of cordless phone systems or in dual band phones accessing sets of these systems/networks.

The controller 18 is connected to the user interface. Thus, it is the controller 18, which monitors the activity in the phone and controls the display 1 in response thereto.

Therefore, it is the controller 18, which detects the occurrence of a state change event and changes the state of the phone and thus the display text. The user may cause a state change event, when he/she activates the keypad 7 including the menu selection key or keys 9, and these type of events are called entry events or user events. However, the network communicating with the phone may also cause a state change event. These type of events and other events beyond the user's control are called non-user events. Non user events comprise status change during call set-up, change in battery voltage, change in antenna conditions, message on reception of SMS, etc.

An embodiment of the invention will be described with reference to FIGS. 4 to 15 showing the various features of a battery lock. In the shown embodiment the battery lock will be holding an internal battery for a communication unit in operative position.

Figure 4:
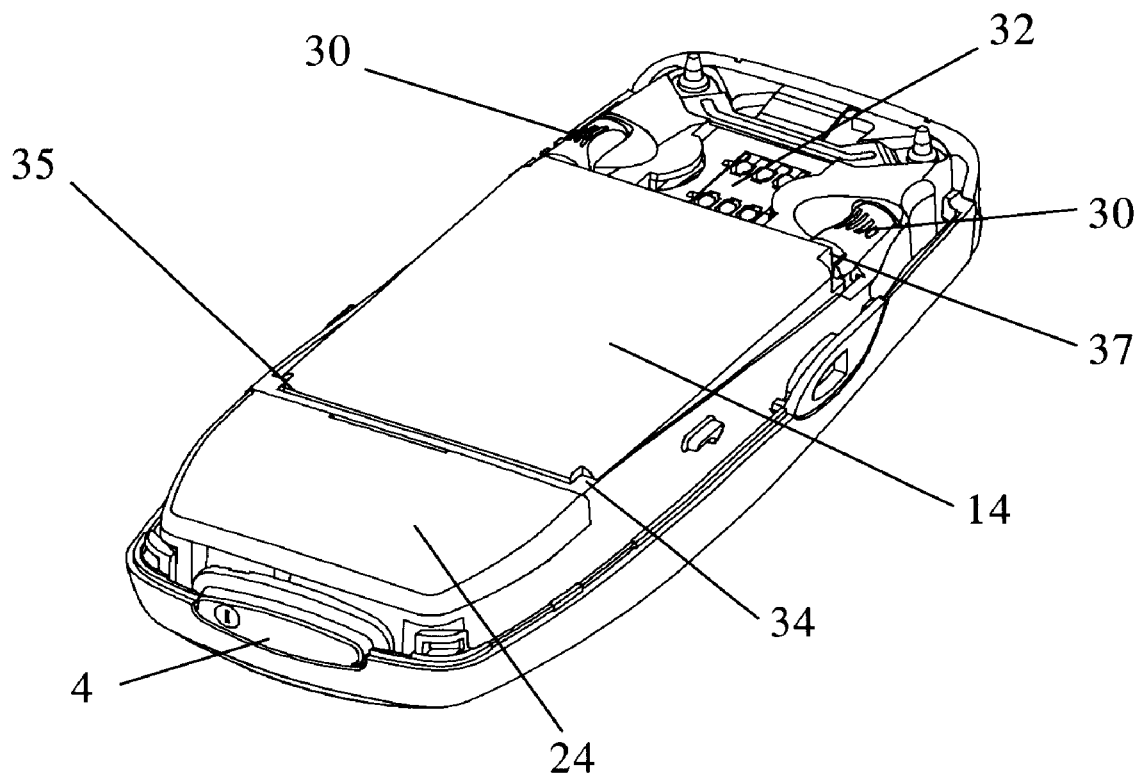
FIG. 4 shows a communication unit, where one removable cover has been removed with an internal battery in operative position.
Figure 5:
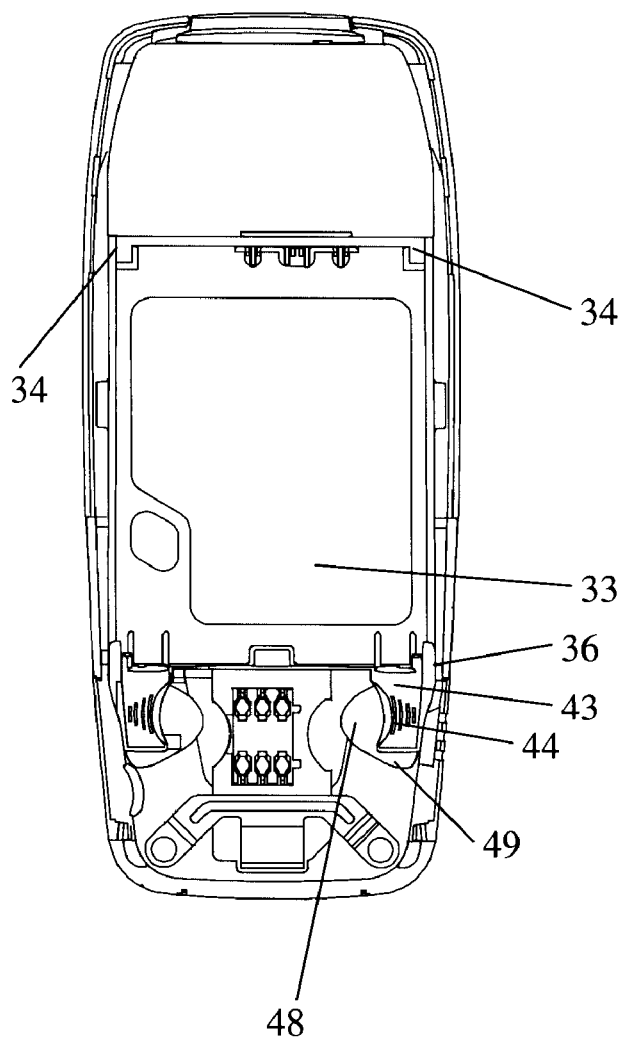
FIG. 5–7 shows a communication unit, where one removable cover has been removed without an internal battery located in operative position.
Figure 6:
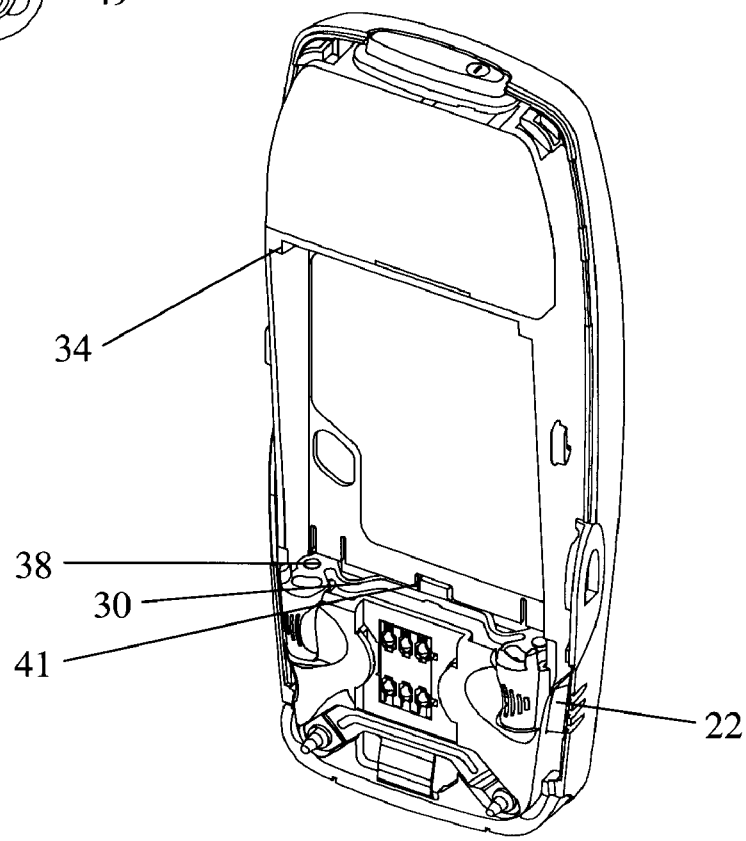
Figure 7:
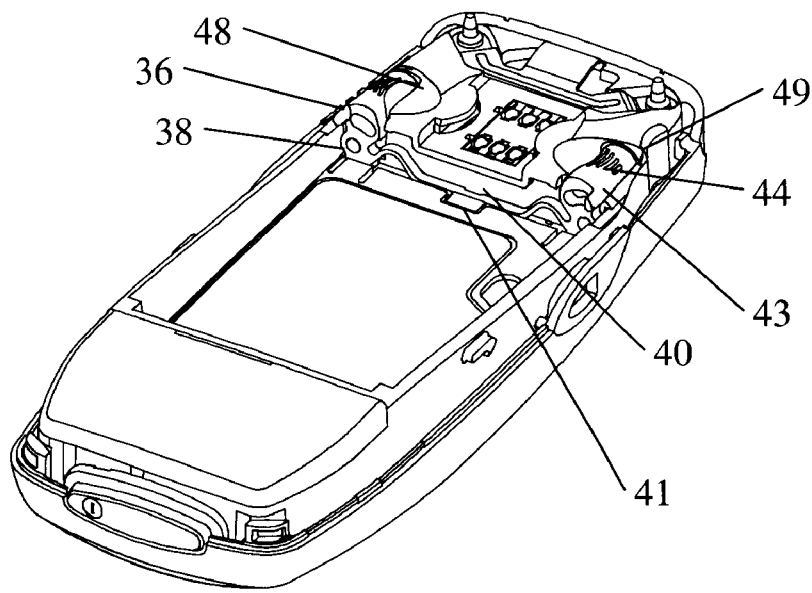
Figure 8:
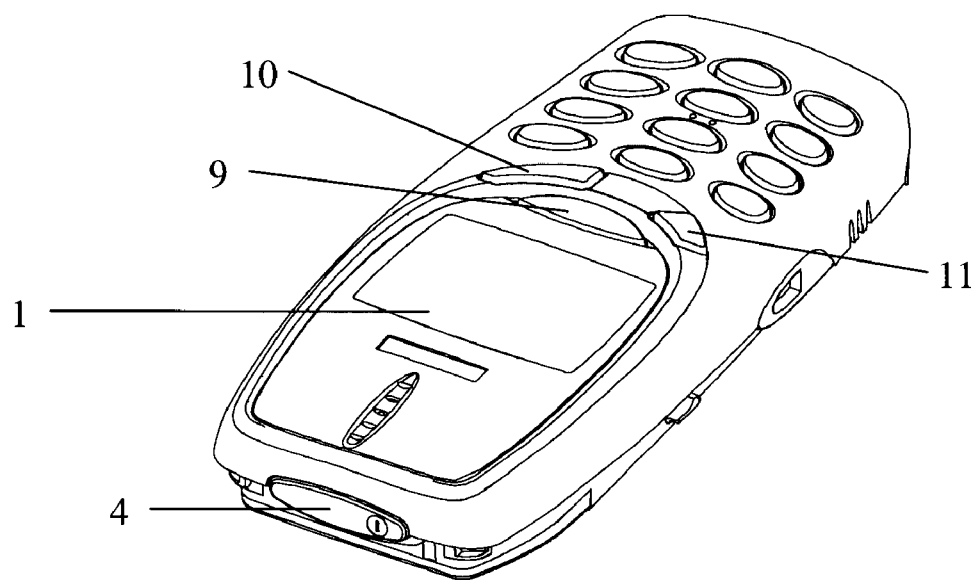
FIG. 8 shows a communication unit, where one removable back cover has been removed.

In FIG. 4 is the removable back cover 13 (shown in FIG. 1 and 2) removed and the battery 14 is visible together with a part of a battery lock 30. In this view is only a part of the battery lock 30 visible. There is also a SIM card reader 32 present that is only accessible when the battery 14 is removed. In FIG. 5 is the battery 14 removed and the battery compartment 33 is visible. The battery compartment 33 is provided with protrusions 34 in one end that projects into corresponding recesses 35 (shown in FIG. 4) on the battery 14 to hold the battery 14 in the operating position in the battery compartment 33. In the other end of the battery compartment 33 is the battery lock 30 release mounted. The battery lock 30 is provided with taps 36 that projects into to another set of corresponding recesses 37 on the battery 14 holding the battery 14 in operating position in the battery compartment 33.

In FIG. 5–8 the battery 14 is removed from the battery compartment 33 to better describe the battery lock 30 and in FIG. 9-12 the battery lock 30 is shown separately. The battery lock 30 comprises a middle part 40 with a protrusion 41, two holes 42 and handles 43. The handles 43 have flanges 44 on the upper side to increase the friction when activated, and curved surfaces 45, on the other side or inner side of the handles 43, to enable a smooth motion when moved over a corresponding curved surface 47 (not shown) on battery compartment 33. The handles 43 are also provided with slots 46 (shown in FIG. 11) that snaps over corresponding protrusions (not shown) on the battery compartment 33 to firmly hold the battery lock 30 in operating position, when the battery lock 30 is mounted in the battery compartment 33.

The battery lock 30 is pivotally mounted on two pivots 38 projecting from one of the walls (not shown) in the battery compartment 33. When the battery lock 30 is mounted on the battery compartment 33 the slots 46 are snapped over the corresponding protrusions (not shown) on the battery compartment 33 and thereby holding the battery lock 30 in an operating position.

The battery 14 is removed from the battery compartment 33 by pressing the handles 43 of the battery lock 30 outwards. By pressing the handles 43 outwards the protrusion part 41 of the battery lock 30 are levered and thereby also the battery 14. The handles 43 further removes the taps 36 out of the recesses 37 and the battery 14 is released and free to be taken away by hand.

Figure 9:
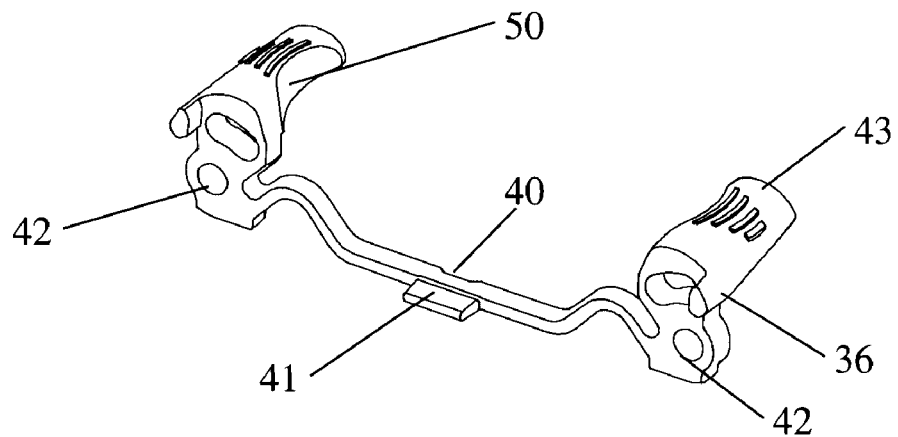
FIG. 9–12 shows a perspective view of an embodiment of the display lock.
Figure 10:
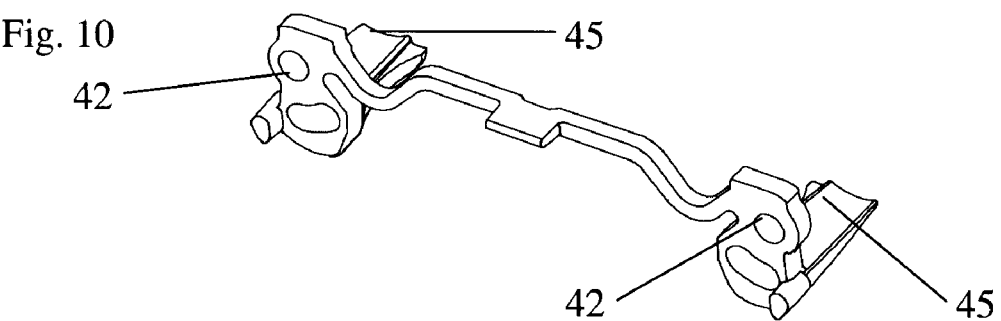
Figure 11:
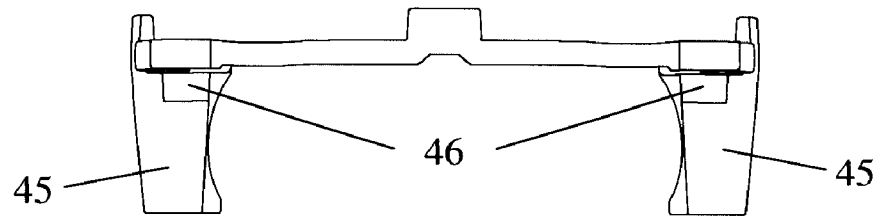
Figure 12:
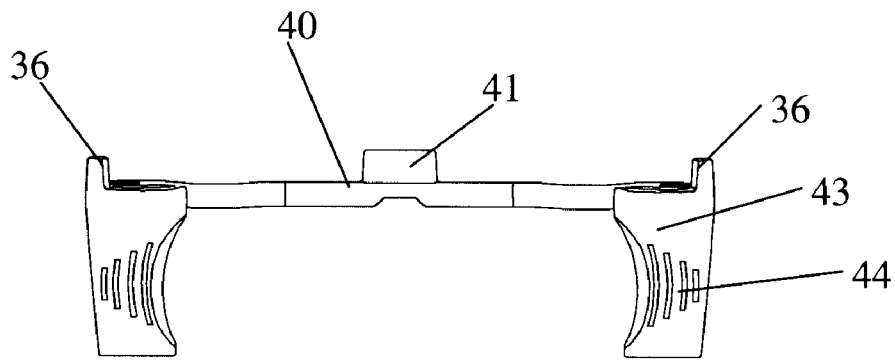

When the handles 43 are pressed outwards, the outer parts of the battery lock 30 rotates around the two pivots in the battery compartment 33. The handles 43 rotate smoothly on its inner curve 45 along curves 47 on the battery compartment. To make it easier for a user to press the handles 43 the battery compartment 33 is provided with recesses 48. The battery compartment 33 is also provided with portions 49 that continue at the end of the handles 43 to perform a smooth continuous curve from the handles 43 to the battery compartment 33. The portions 49 reduces any risk for unintentionally lifting the end of the handles 43 and thereby removing the battery lock 30 from its operating and functioning position. In FIG. 9 is also shown that the handles 43 is provided with a curved surface 50 that makes it easier to get a grip of the handles 43 when aiming to press the handles 43 outwards. This curved surface 50 interacts with the recess 48 of the battery compartment 33.

Figure 13:
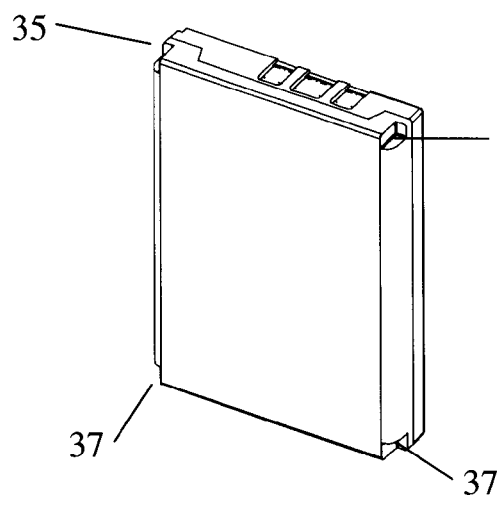
FIG. 13–14 shows an internal battery in perspective view.
Figure 14:
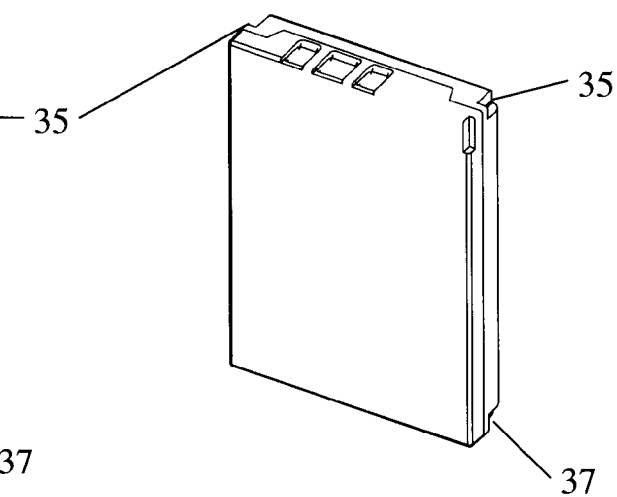

In FIG. 13–14 the battery 14 is shown when it is removed from the battery compartment 33. The battery 14 is as earlier mentioned provided with recesses or slots 35, 37 that interacts with protrusions and taps 34, 36 to hold the battery 14 in the battery compartment 33. These slots and protrusions in combination prevents the battery 14 being removed from the battery compartment 33 by any other way than by releasing the battery lock 30.

Figure 15:
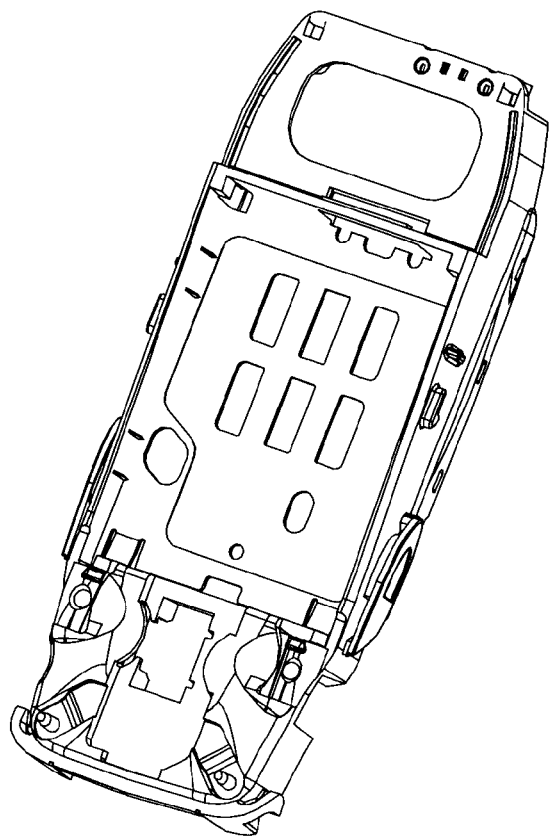
FIG. 15 shows an internal structure of a communication in perspective view, where all parts are removed.

In FIG. 15 an internal structure of a phone is shown where almost all parts are removed. The battery compartment 33 forms a part of the internal structure.

The invention is not limited to the above-described examples or to the drawings showing examples of an embodiment, but can be varied within the scope of the appended claims.

What is claimed is:

1. Battery lock for a communication unit having a battery holder for retaining a battery pack in an internal battery compartment characterized in that the battery holder comprises:
   a holding means for retaining the battery pack in said internal battery compartment;
   a release mechanism that releases the holding means when actuated; and
   a push mechanism that pushes the battery pack at least partly out of said internal battery compartment upon activation of said release mechanism.

2. Battery lock for a communication unit according to claim 1 characterized in that the battery compartment includes protruding parts corresponding to slots on the battery, and that said protruding parts co-operate with said holding means of the battery to hold the battery in the battery compartment.

3. Battery lock for a communication unit according to claim 2 characterised in that the holding means includes first protruding parts to hold the battery in the battery compartment, grips to lift and release the battery, holes to hinge the battery lock in the battery compartment, second protruding parts to lift the battery actuated by the grips and fastening means to fasten the battery lock to the battery compartment.

4. Battery lock for a communication unit according to claim 3 characterised in that the lifting means are activated by pressing the grip outwards, away from each other, thereby levering the second protruding part, so that the first protruding parts holding the battery release the battery.

5. Battery lock for a communication unit according to claim 3 characterized in that the second protruding part that lever the battery, when the grips are pressed outwards, are located on a beam connecting the first protruding parts.

6. Battery lock for a communication unit according to claim 4 characterised in that the protruding parts for holding the battery are extending from the grips, and project into the slots on the battery.

7. Battery lock for a communication unit according to claim 3 characterised in that the fastening means on the battery compartment to fasten the battery lock to the battery compartment include pivots to hinge the battery on, locking flaps to keep the battery lock on the pivots and protruding parts that connect to slots on the grips of the battery lock.

8. Battery compartment in a communication unit having means for holding a battery in said battery compartment characterized in that the battery compartment includes protruding parts corresponding to slots on the battery, and that said protruding parts co-operate with holding means of the battery to hold the battery in the battery compartment.

9. Battery compartment in a communication unit according to claim 8 characterised in that the battery compartment includes fastening means to fasten the battery lock to the battery compartment and that these means include pivots to hinge the battery on, locking flaps to keep the battery lock on the pivots, slots for receiving grips of the battery holder, protruding parts in these slots that connect to slots on the grips of the battery lock, and the slot having cavity side walls and raised parts in one end of the slot for receiving the grips of the battery holder.

10. A battery for a communication unit having an internal battery characterized in that the battery have slots to hold the battery in a battery compartment by a battery lock according to claim 1.

11. A method for holding an internal battery in a communication unit characterised in that a battery lock is used to hold the battery, where said battery lock includes holding, lifting and releasing features.

12. Battery lock for a communication unit according to claim 1, wherein said holding means retains said battery pack within an outer cover of said communication unit.

13. Battery lock for a communication unit according to claim 1, wherein said release mechanism and said push mechanism operate to release and push said battery pack from an operating position.

14. Battery compartment in a communication unit according to claim 8, wherein said holding means holds said battery in the battery compartment within an outer cover of said communication unit.

15. Method according to claim 11, wherein said battery lock holds said battery within an outer cover of said communication unit.

16. A communication unit having a battery holder for retaining a battery pack in an internal battery wherein the communication unit comprises: provisions for retaining the battery pack in said internal battery compartment; a release mechanism that releases the holding provisions when actuated; and a push mechanism that pushes the battery pack at least partly out of said internal battery compartment upon activation of said release mechanism.

17. A communication unit having a battery compartment having provisions for holding a battery in said battery compartment characterized in that the battery compartment of the communication unit includes protruding parts configured to fit slots of a battery, and that said protruding parts co-operate with holding means of the battery to hold the battery in the battery compartment.

\* \* \* \* \*